United States Patent [19]

Van Pay et al.

[11] Patent Number: 5,572,925
[45] Date of Patent: Nov. 12, 1996

[54] MULTIPLE COLUMN CHEESE BLOCK FORMER

[75] Inventors: Stephen J. Van Pay; Thomas L. Niermann, both of Green Bay; Blake A. Halderson, Valders, all of Wis.

[73] Assignee: Stoelting, Inc., Kiel, Wis.

[21] Appl. No.: 524,603

[22] Filed: Sep. 7, 1995

[51] Int. Cl.⁶ .............. A01J 11/06; A01J 25/00; A01J 25/11; A23C 19/00
[52] U.S. Cl. .................. 99/454; 99/456; 99/458; 99/460
[58] Field of Search .................. 99/452–459, 460, 99/461, 465; 100/104, 126, 127, 125; 425/85, 147, 308, 444; 426/478, 486, 491, 517, 36

[56] References Cited

U.S. PATENT DOCUMENTS

| | | | |
|---|---|---|---|
| 3,805,689 | 4/1974 | Berger et al. | 99/461 |
| 3,969,995 | 7/1976 | Krueger et al. | 99/458 |
| 4,018,145 | 4/1977 | Hensel | 99/458 |
| 4,157,680 | 6/1979 | Charles | 100/125 |
| 4,244,286 | 1/1981 | Rust | 99/459 |
| 4,539,902 | 9/1985 | Brockwell et al. | 99/454 |
| 4,942,052 | 7/1990 | Posdal | 426/512 |
| 5,001,972 | 3/1991 | Greenfield et al. | 99/454 |
| 5,082,681 | 1/1992 | Barlow et al. | 99/456 |
| 5,175,014 | 12/1992 | Brockwell et al. | 426/582 |
| 5,404,802 | 4/1995 | Millerbernd et al. | 99/454 |

FOREIGN PATENT DOCUMENTS

| | | | |
|---|---|---|---|
| 0368411A1 | 5/1990 | European Pat. Off. | A01J 25/11 |
| 2209266 | 10/1988 | United Kingdom | A01J 25/11 |
| WO89/08978 | 10/1989 | WIPO | A01J 25/11 |

Primary Examiner—Timothy F. Simone
Attorney, Agent, or Firm—Whyte Hirschboeck Dudek S.C.

[57] ABSTRACT

Multiple columns of cheese curd are simultaneously compressed and cut into blocks of cheese by feeding curd into the top perforated tubular linings hanging freely within hollow towers, all towers positioned on a single, enclosed sanitary housing. A negative pressure is maintained in each tower to draw curd into the tower. Each pillar of curd is supported by a single guillotine blade closing off the bottom of all the towers and located within the sanitary housing. Each perforated, freely hanging lining is spaced apart from the wall of its tower to form a drainage passage for whey pressed out from the curd by the weight of the superimposed pillar. The guillotine blade is then withdrawn and each pillar of curd is lowered by an elevator into a cheese form positioned below each tower and within the housing. The guillotine blade is then returned to its closed position, so as to cut off a block of curd from each pillar. The direction of each elevator is then reversed, causing each block of cheese to be pressed up against the bottom of the guillotine blade and out against the sides of its cheese form. Once each cheese block has been compressed, each elevator is withdrawn, leaving each cheese block remaining in its form. Each form is then rotated to a substantially horizontal position and each cheese block is then ejected into a bag being held by a bagging device located adjacent each cheese form. The bagged blocks of cheese are then released from the bagging device for transport to a processing station.

6 Claims, 5 Drawing Sheets

MULTIPLE COLUMN CHEESE BLOCK FORMER

BACKGROUND OF THE INVENTION

1. Field of the Invention

This invention relates generally to the manufacture of cheese, and more particularly, to an apparatus used to form multiple blocks of compressed natural cheese during a single run.

2. Description of the Prior Art

While natural cheese in many forms enjoys wide use by consumers, it is a relatively expensive product due in great part to the use of hand labor and the long processing time required to produce the cheese. This is especially true of cheeses such as longhorn which are produced in round blocks having a maximum weight of twenty pounds. Because of their round shape and small size, these types of blocks continue to be produced by hand. Although the cheese block formers of the prior art typically produce blocks of cheese in square, forty pound blocks, they are not satisfactory for producing small, round blocks of cheese.

The conventional, natural cheese processing and manufacturing process involves the formation of a cheese curd from milk. Customarily, pasteurized milk is inoculated with a cheese starter culture of a selected microorganism. The inoculated milk is then cultured to develop flavor. Rennet or another suitable coagulant is then added to the cultured milk to form a curd. The curd is transferred to a drain table or similar device so that excess whey drains from the curd such that a curd matte is formed. Next, the curd matt is cut and salted. Salting adds flavor to the curd and assists in extracting whey trapped in the fat molecules of the curd. Once salted, the curd is placed in hoops or other suitable molds which are typically fitted with cheesecloth, and the curd is pressed to remove residual whey such that a cheese block is formed. The cheese blocks are then removed from the hoops, and each cheese block is aged for a predetermined period of time to produce a product which meets the appropriate standard of identity for the cheese being made.

For smaller blocks of cheese, these operations have been and, to a large extent, still are carried out by hand. However, hand production of cheese involves considerable expense and subjects the product to contamination by workers, airborne contaminants (microorganisms) and contaminated equipment. Furthermore, due to human variations in procedures, the product quality is typically not uniform.

With respect to large blocks of cheese, an increasing volume of cheese is being manufactured commercially by forming blocks of natural cheese from prepared cheese curd by forming a pillar of curd in upright cheese block formers. Typically, these cheese formers comprise a hollow tower having an opening at the bottom of the tower. A perforated tubular column is disposed within the tower and over the hole such that an annular drainage passage is formed between the column and the tower. A guillotine is disposed below the tower, the blade of the guillotine movable between a closed position closing the lower end of the column and an open position in which the lower end of the column is open. A vacuum is maintained in the tower during the cheese making process to draw curd into the tower. With the bottom of the column closed, curd is introduced at the top of the tower into the perforated column such that a pillar of curd is formed within the column. As the pillar of curd forms, whey is expressed from the lower end of the pillar of curd due to the weight of the curd superimposed thereon. The whey passes through the perforations in the column and into the drainage passage. The vacuum functions to draw the curd into the tower, as well as draw whey out of the curd pillar. An elevator positioned below the tower functions to lower the pillar of curd when the guillotine is in an open position, allowing the lower end of the pillar of curd to project out of the lower end of the column. When a pillar of curd is supported in this manner, the guillotine blade is moved into its closed position such that a block of cheese is cut from the lower end of the pillar of curd. The blocks of cheese are then ejected onto a conveyor for transport to a packaging station.

A device representative of the prior art is taught in U.S. Pat. No. 5,001,972. In this patent, the tower comprises a tubular casing, and the perforated lining comprises a preformed tube formed as an integral structure prior to fitting of the tube into the tower. The perforated lining is square, and although pre-formed, the lining is permanently attached inside the tower. The inner portions of the tower, including the perforated lining, are cleaned by way of spray balls positioned within the tower. Once a block of cheese has been cut and lowered by an elevator positioned below the tower, the block is ejected through a door in the base of the elevator by way of an ejector ram.

While various automated procedures exist for preparing large blocks of cheese, the prior art does not teach devices which are suitable for preparing smaller blocks of cheese in a cost effective manner. The cheese block formers of the prior art produce square blocks of cheese weighing forty pounds or more, and as such, the prior art cheese block formers are not suitable for producing blocks of cheese having a round shape and weighing in the range of twenty pounds or less. In addition, the prior art devices do not produce a product which is ready for packaging without further processing. Once a forty pound block of cheese has been ejected from a prior art block former, the cheese block is transferred to another station for packaging. This additional processing results in higher costs and increases the likelihood of contaminating the product before packaging. Finally, because the internal perforated tubular linings are typically fixed within the prior art devices, the linings are difficult to remove for cleaning or replacement.

Accordingly, it is an object of the present invention to provide an improved apparatus for economically producing round blocks of cheese in the weight range of zero to twenty pounds. The cheese blocks as formed should be ready for packaging without further processing. Additionally, in that further processing is not required, it would be desirable to package the cheese blocks immediately after they have been cut by the guillotine blade.

It is another object of the present invention to provide a cheese block former having an internal, perforated screen which is easily removable for cleaning and maintenance and easily interchangeable with screens having other shapes and/or dimensions.

Other objects and advantages of the invention will become apparent upon reading the following detailed description and claims, and upon reference to the accompanying drawings.

SUMMARY OF THE INVENTION

The foregoing and other objects of the present invention are achieved by the herein described improved apparatus for preparing round blocks of cheese weighing approximately twenty pounds or less.

The apparatus of the invention broadly comprises in part a plurality of hollow towers, each tower having a base formed with an opening therein. Positioned within each tower above the opening is a perforated, tubular screen which hangs freely from the top of its tower. Each tubular screen is open at its lower end to provide access to the base of its tower. The plurality of towers are all attached to a base which incorporates a guillotine having a blade movable from a first position in which the opening in each tower is closed off to a second position in which the opening in each tower is unobstructed. Positioned below each tower is an elevator which functions in conjunction with a cheese form. The cheese form is rotatable between a first position in which the form is coaxial with its corresponding tower and elevator and a second position in which the form is coaxial with a cheese block packaging apparatus located adjacent the elevator. An ejection ram is positioned opposite each packaging apparatus and functions to discharge cheese blocks from a cheese form into a package held by a packaging apparatus or directly onto a conveying means.

During operation, each tower is provided with cheese curd introduced into the screen at the top of the tower. Although the preferred embodiment of the present invention maintains separate and distinct towers and perforated screens, a single device can be used to introduce cheese curd into all of the towers. A pillar of compressed cheese curd forms within each screen at the bottom of each tower, the base of the cheese pillar resting against the upper surface of the guillotine blade. Once an acceptable cheese pillar has formed within each tower, the guillotine blade is withdrawn and each pillar of curd drops down into its corresponding cheese form such that the pillar is resting on its corresponding elevator. The position of each elevator can be varied depending on the weight and length of the cheese block desired. When each elevator is adjusted to the desired position, the guillotine blade is closed, severing a block of cheese from the base of each curd pillar. While the guillotine remains in its closed position, each elevator applies pressure to the bottom of its cheese block, forcing the cheese block up into the cheese form and against the bottom of the guillotine blade. The cheese forms are then rotated and the cheese blocks are ejected into packaging being held adjacent the open end of each cheese form.

BRIEF DESCRIPTION OF THE DRAWINGS

In the drawings which illustrate that which is presently regarded as the best mode for carrying out the invention.

DETAILED DESCRIPTION OF THE PREFERRED EMBODIMENT

In the detailed description of this invention, like numerals are employed to designate like parts throughout the same. Various items of equipment, such as fasteners, fittings, etc., are omitted so as to simplify the description. However, those skilled in the art will realize that such conventional equipment can be employed as desired.

Figure 1:
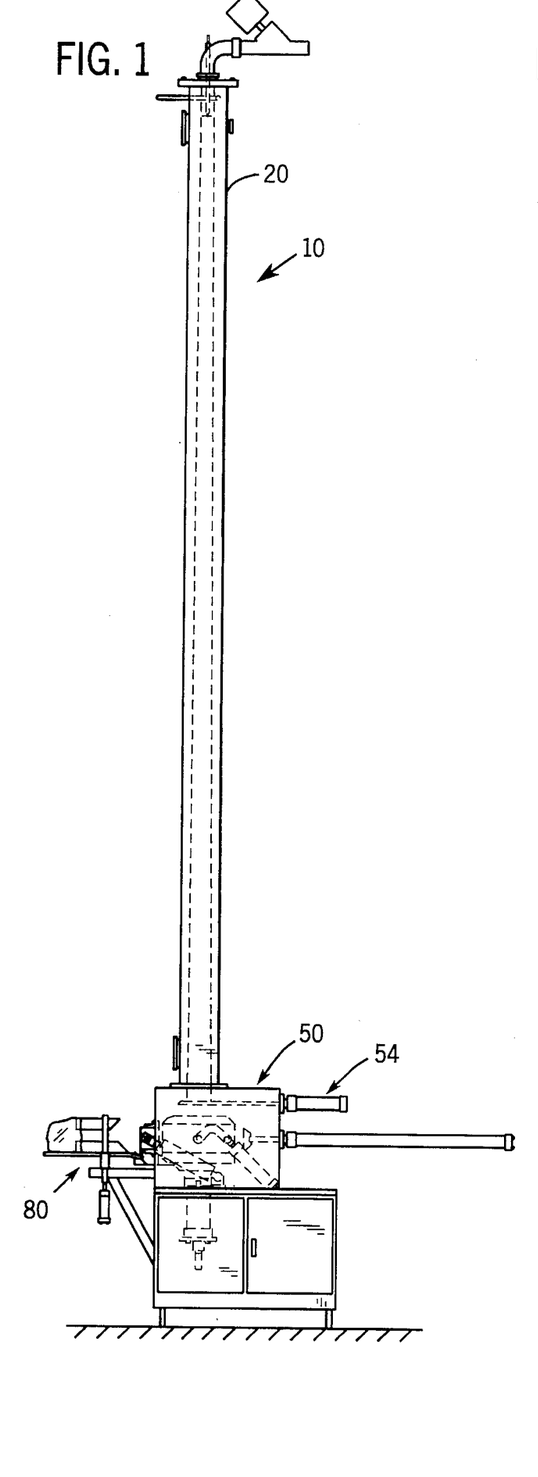
FIG. 1 illustrates an elevated side view of a three towered cheese block former.
Figure 2:
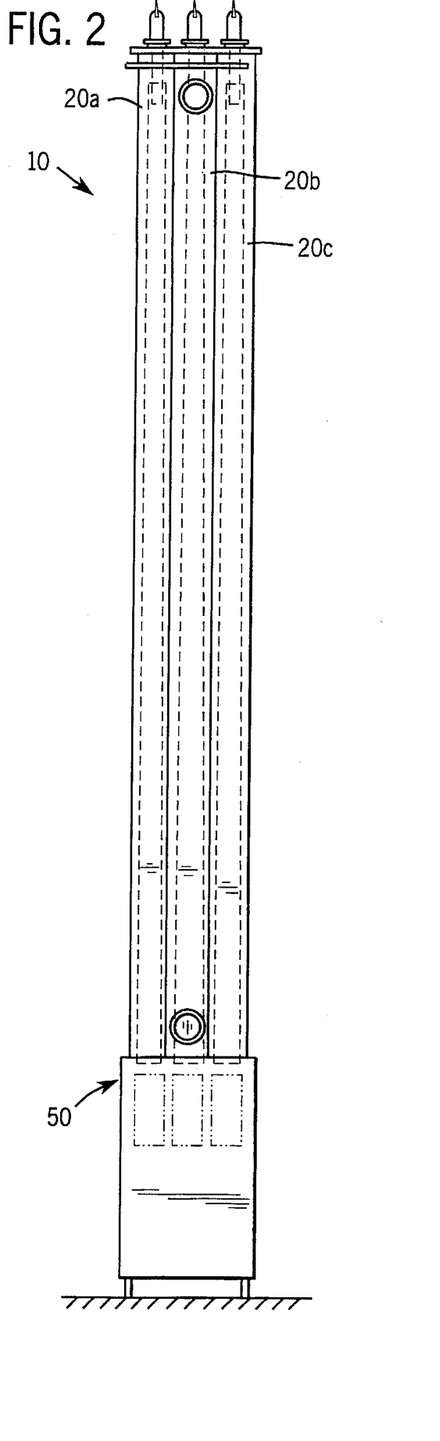
FIG. 2 illustrates an elevated front view of the multi-towered cheese block former of FIG. 1.

With reference to FIGS. 1 and 2, the cheese block former 10 of the present invention comprises a base 50 on which is mounted a plurality of towers 20a, 20b, 20c, a guillotine apparatus 54, and a bagging apparatus 80.

Figure 3:
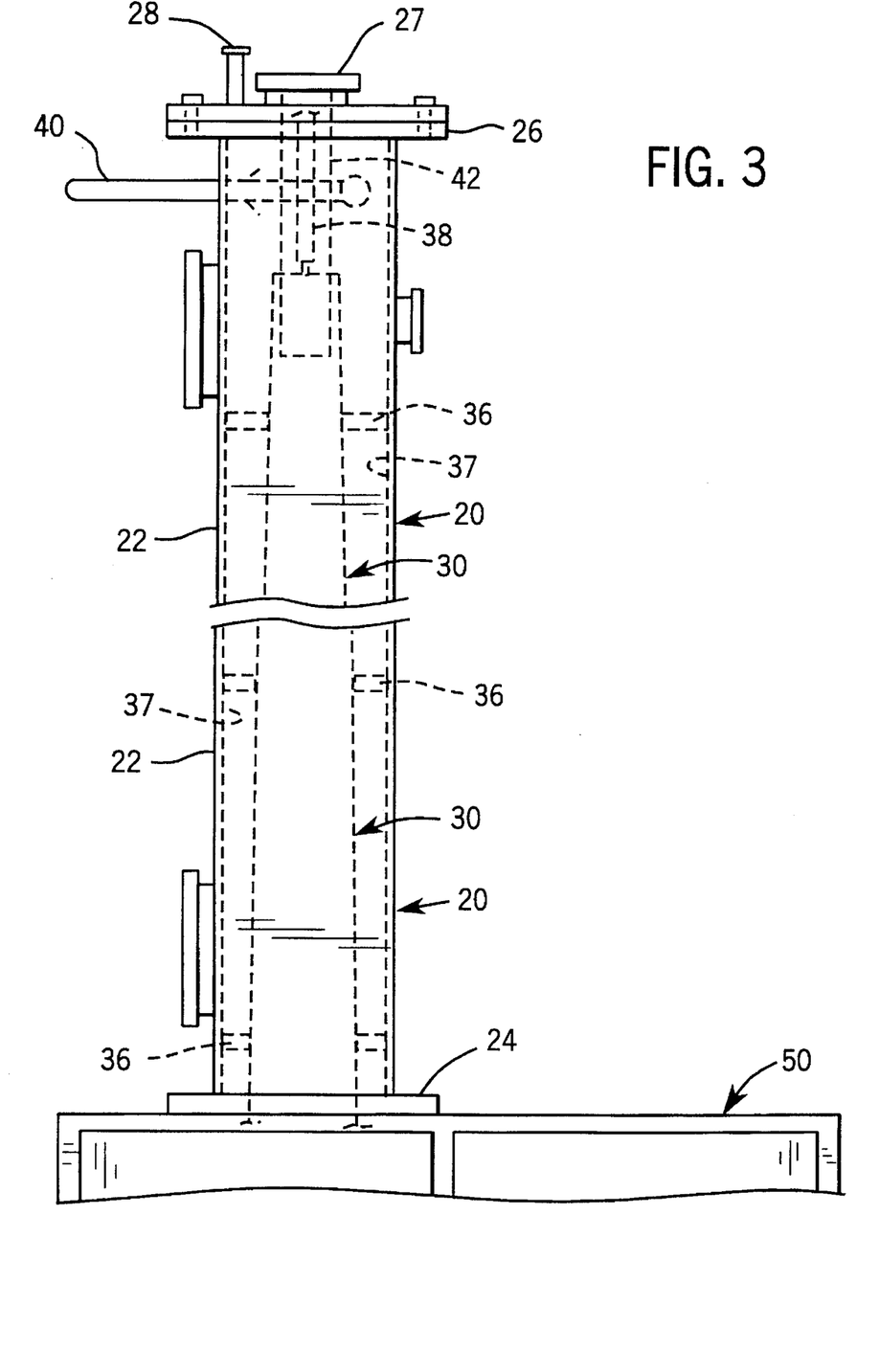
FIG. 3 illustrates a sectional view of a tower which comprises the cheese block former of FIG. 1.

As shown in FIG. 3, each tower 20 is comprised of a long, tubular casing 22 which is open at both ends and having a bottom flange 24 which permits casing 22 to be mounted in gas-sealing engagement to base 50. Casing 22 is also provided with a top flange 26, a curd inlet port 27 and a vacuum port 28. Axially disposed within casing 22 is a tubular screen 30 having a cylindrical shape and which is also opened at both ends. Top flange 26 is provided for attachment of screen 30 and a curd inlet tube 42 which extends through curd inlet port 27 into the interior of screen 30. Although towers 20a, 20b, and 20c are maintained independently of one another, it has been found that a single curd inlet tube 42 is sufficient to provide curd from a curd feed means (not shown) to all of the towers of cheese block former 10. Also extending into the interior of both casing 22 and screen 30 is probe 38 for sensing the level of curd in tower 20. C.I.P. (Clean-In-Place) spray balls 40 are disposed within casing 22 for cleaning the interior of tower 20.

Figure 4A:
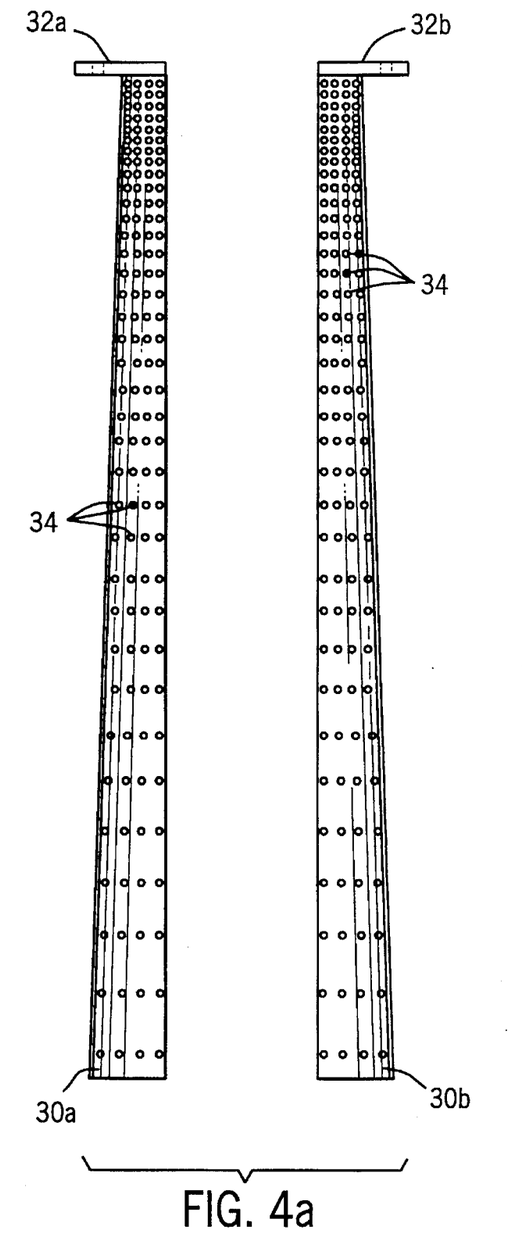
FIG. 4a illustrates an elevated, exploded side view of a perforated screen.
Figure 4B:
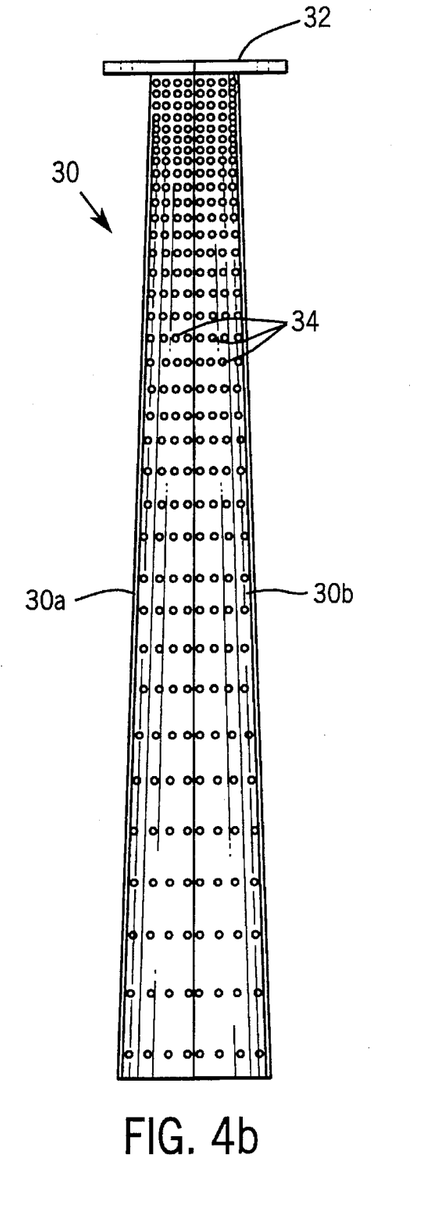
FIG. 4b illustrates an elevated, side view of a perforated screen.

Screen 30 is a two-piece structure comprised of a first semi-circular half 30a and a second semi-circular half 30b (see FIGS. 4a, 4b). Each half 30a, 30b is configured for mating with the other half such that screen 30 having a circular cross-section is formed when the two halves 30a, 30b are so joined. It has been found that by constructing screen 30 in two halves, screen 30 is more easily cleaned when removed from its tower. In addition, each half 30a, 30b is configured so that the diameter of the cross-section of screen 30 increases along the axial length of the tube from top to bottom. Therefore, when first half 30a is joined with second half 30b, the walls of screen 30 are inclined outward at a small angle relative to the axis of tower 20 in a downward direction.

The upper end of each screen half 30a, 30b is also provided with an outwardly projecting, semi-circular flange 32a, 32b such that the mating of the two halves 28a, 28b forms a circular flange 32 at the top of screen 30. Flange 32 mounts on top of top flange 26 so that screen 30 is axially suspended within casing 22, hanging freely therein such that the lower open end of screen 30 is disposed over the lower open end of casing 22. Because screen 30 hangs freely from the top of tower 20, annular centralizers 36 may be disposed along the length of screen 30 to maintain axial alignment with casing 22. Those skilled in the art will understand that the largest diameter of screen 30 is substantially smaller than the corresponding inner diameter of casing 22 so that when screen 30 is suspended within casing 22, an annular drainage passage 37 is defined therebetween. Annular passageway 37 is in fluid communication with base 50 such that residual whey within annular passageway 37 drains down into base 50.

The side walls of screen 30 are provided with a multiplicity of drainage apertures 34, the apertures generally being spaced apart over the entire area of screen 30. Apertures 34 permit fluid communication between the interior of screen 30 and annular passageway 37. Although apertures 34 are spaced over the entire area of screen 30, the density of the apertures at the upper portions of screen 30 is greater than the density of the apertures at the lower portion of screen 30, such that the density of apertures 34 decreases along the length of screen 30 from top to bottom.

Figure 5:
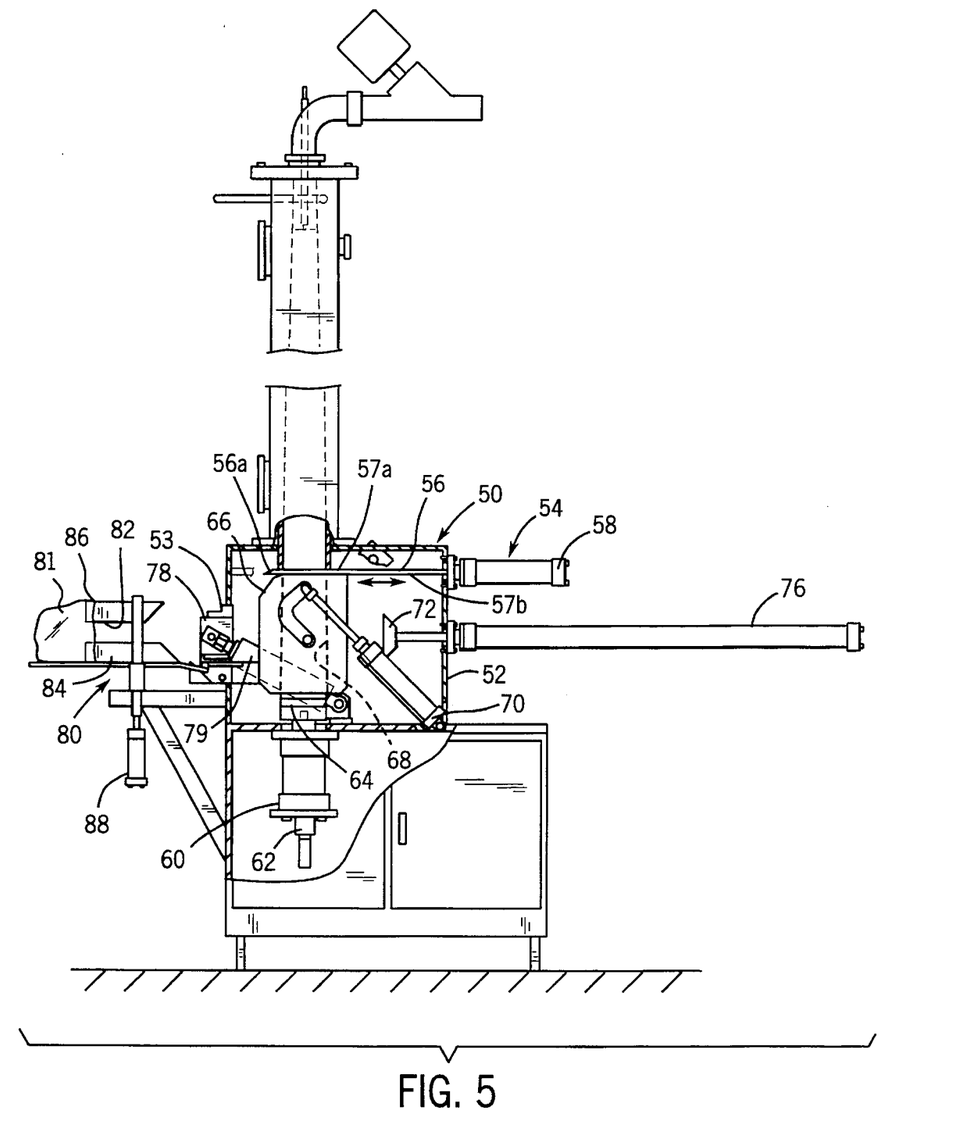
FIG. 5 illustrates a sectional side view of the base of the cheese block former during cheese block compression.
Figure 6:
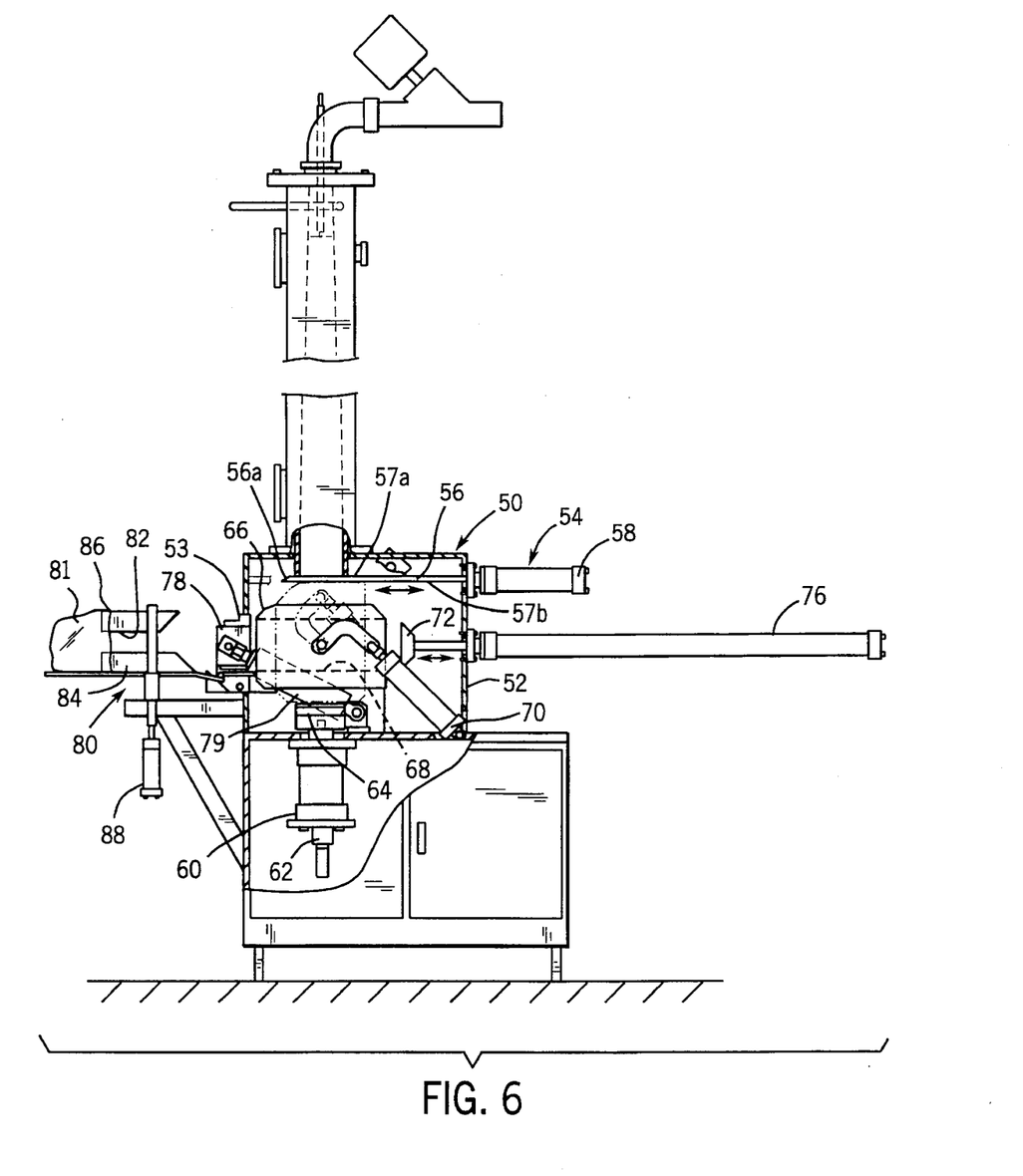
FIG. 6 illustrates a sectional side view of the base of the cheese block former during cheese block ejection.

Turning now to FIGS. 5 and 6, base 50 is comprised of a housing 52, guillotine apparatus 54, an elevator 60, a cheese form 66 and an ejection ram 72. Housing 52 defines a chamber below towers 20a, 20b, 20c, providing a sanitary area in which cheese block cutting and cheese block pressing take place. Guillotine apparatus 54 is comprised in part of a single, linearly movable blade 56 defined by a cutting edge 56a, a top surface 57a and a bottom surface 57b. Guillotine apparatus 54 is disposed on base 50 such that blade 56 is adjacent the bottom of towers 20a, 20b, 20c which open into housing 52. Piston 58 is used to actuate blade 56 which is movable from a first position in which the opening in each tower 20a, 20b, 20c is closed off to a second position in which the opening in each tower 20a, 20b, 20c is unobstructed. In the preferred embodiment, cutting edge 56a is beveled adjacent top surface 57a to facilitate curd cutting. Housing 52 also defines an opening 53 which serves to provide outside access to the interior of housing 52. Opening 53 is provided with a access door 78 which is driven between an open position and a closed position by piston 79.

Positioned within housing 52 and below each tower 20 is an elevator 60 which functions in conjunction with a cheese form 66. Elevator 60 is operable by a piston 62 to move elevator platform 64 along a path which is coaxial with tower 20 and cheese form 66. Cheese form 66, which is rotatably mounted between elevator 60 and tower 20, is comprised in part of a an open-ended tube 68 which permits elevator platform 64 to move coaxially within tube 68. Cheese form 68 is operable by a piston 70 to rotate form 68 between a first position in which form 68 is coaxial with tower 20 and elevator 60 (FIG. 5) and a second position in which form 68 is coaxial with ejection ram 72 located opposite access door 78 (FIG. 6).

A linearly moving ejection ram 72, operable by piston 76, is also located within housing 52. Ram 72 is aligned to extend through cheese form 66 and access door 78 when cheese form 66 is in its second position and access door 78 is open (FIG. 6). Located outside of housing 52 and adjacent access door 78 is bagging apparatus 80 which, when used, serves to hold bags 81 for receipt of cheese blocks as they are ejected from housing 52. Bagging apparatus 80 is comprised in part of a chute 82 defined by a first guide 84 and a second guide 86, wherein first guide 84 is fixed and positioned below second guide 86. Second guide 86 is movable between a first position and a second position, such that the diameter of chute 82 may be altered by altering the position of second guide 86 relative to first guide 84. In the first position, second guide 86 is disposed for inserting and removing bag 81 from apparatus 80, and in the second position, second guide 86 is disposed for maintaining bag 81 in a fixed, open position for receipt of a cheese block. Specifically, when second guide 86 is in a first position, the diameter of chute 82 is smaller than when second guide 86 is in a second position. Piston 88 is utilized to drive second guide 86 between positions. In addition, first guide 84 is maintained at approximately the same level as cheese form 68 when cheese form 68 is in its second position, thus permitting ejection ram 72 to extend through chute 82 to urge a cheese block out of cheese form 68 and into bag 81. Once bag 81 has been filled with a cheese block, the bagged cheese block is released from bagging apparatus 80 and falls onto a conveyor 88 for transport to another processing station (not shown).

The operation of cheese block former 10 will now be described. At the start of the operational cycle, guillotine blade 56 is in its closed position such that the interiors of towers 20a, 20b, and 20c are closed off from the interior of housing 52. A vacuum means (not shown) is used to evacuate air through vacuum port 28 of each tower such that a negative pressure is formed within each tower. When a high vacuum is obtained in each tower, the difference between the low pressure in the tower and comparatively high atmospheric pressure acting on the curd in the curd inlet tube 42 causes curd to flow into the interior of each screen 30 such that a pillar of curd is formed within each screen 30, the base of each pillar resting on the top 57a of blade 56. In each tower, the weight of the curd in screen 30 compresses the curd at the lower end of the pillar and forces whey out of the curd. This whey drains through apertures 34 and into drainage passage 37, where the whey is removed through whey drainage ports 25. Curd entering screen 30 is immediately subjected to the lower pressure within tower 20 such that air, moisture vapor, and whey entering with the curd is withdrawn through vacuum port 28.

The top of screen 30 is more densely apertured than the bottom of screen 30 because the pull of the vacuum on the curd in curd inlet tube 42 is enhanced by the presence of additional apertures. Furthermore, although the weight of the curd is useful in driving whey out of the lower portions of the pillar, it has been found that by providing more apertures in the top of screen 30, a greater amount of whey can be drawn out of the curd before the curd begins to settle within screen 30. However it would be undesirable to provide the same density of apertures at the lower end of screen 30 because the shape of the curd pillar is formed in this area as pressure is superimposed from above. Under such relatively high pressure, cheese curd would tend to seep out of the apertures such that the curd pillar is formed with an undesirable surface. In addition, the apertures would become obstructed such that residual whey would be prevented from draining into drainage passage 37.

When the pillar of curd in each tower has reached a predetermined height indicated by that tower's level probe 38, each elevator 60 is raised to a position adjacent guillotine blade 56, and blade 56 is withdrawn to its open position to allow each pillar of curd to drop down into its corresponding cheese form 66 and onto its corresponding lift 56. The small outward inclination of the walls of screen 30 in the downward direction reduces the frictional resistance between the walls of screen 30 and the curd during the downward movement of the pillar of curd. Each pillar of curd is then lowered further into its cheese form 66 by its elevator 60 to a distance corresponding to the desired depth, and hence weight, of the block of cheese being processed. Subsequently, guillotine blade 56 is driven back into its closed position so as to sever a block of cheese from the lower end of each pillar of curd extending into housing 52.

The direction of each elevator 60 is then reversed, and the blocks of cheese are forced up against the bottom 57b of blade 56 for a predetermined amount of time, such that the bottom 57b of blade 56, the interior sides of cheese form 66 and the top surface of elevator lift 62 function as a cheese mold when pressure is applied by elevator 60. This step serves to provide the cheese block with a finished surface which is suitable for packaging. Once each cheese block been sufficiently molded by this process, each elevator 66 is withdrawn from the interior of its cheese form 66. The blocks of cheese remain in their corresponding forms. Each cheese form 66 is then rotated to its second position, and simultaneously, access door 78 is opened. Each ejection ram 72 is then activated to urge each block of cheese out of its cheese form 66 and into the adjacent bag 81 being held open by its corresponding bagging apparatus 80.

Those skilled in the art will understand that although cheese block former 10 has been described as having three towers, this number of towers has been selected for illustrative purposes only and that any plurality of towers may be used in conjunction with the device. Of course, the number of towers will also dictate the number of elevators, cheese forms, ejection rams, and bagging apparatuses necessary for the proper functioning of the device. However, in any case, it is the smaller size of the towers (compared with the prior art) that permits multiple columns to be utilized with a single base.

Although each tower 20a, 20b, 20c stands independently of the other towers, the arrangement of the towers on a single base provides several advantages. First, although the cheese blocks are formed independently of one another, the cheese block former can utilize a single, integrated feed means (not shown), guillotine apparatus 54, and set of controls (not shown) such that these elements do not have to be duplicated for each tower. Second, although a single system or apparatus is used in conjunction with all of the towers of cheese block former 10, the finished product, namely a cut and formed block of cheese, can be independently varied from tower to tower. As an example, but not intended as a limitation, a first tower may be configured to form and cut twelve inch rounds weighing twenty pounds, while a second tower may be configured to form and cut six inch round weighing six pounds.

Another advantage of the multiple column cheese block former of the present invention is that the smaller size of the cheese blocks formed results in smaller residue times and smaller vacuum pressures, such that the number of cheese blocks produced per unit of time is increased.

Another advantage of the multiple column cheese block former of the present invention is that the free-hanging screen is easily removed for maintenance, cleaning or interchange with screens having other dimensions or shapes, e.g. a square screen. Such a feature is desirable because the down time for performing these tasks is greatly reduced. Specifically, to remove a screen of the present invention, the top flange of the screen is detached from the top flange of the tower, and the screen is lifted straight out of the tower. In contrast, similar screens taught in the prior art are permanently fixed within their towers, or, if removable, require a great amount of disassembly of the prior art cheese block former and hence a long down time. Because the screen of the present invention hangs from the top of its tower, the screen is self-centering and does not require additional attachment at the base of the screen to maintain axial alignment with its tower.

Another advantage of the invention described above is that the cutting and forming occur in a sanitary environment, i.e., the housing, and the cheese blocks are then immediately ejected into bags for packaging. Therefore, by performing all of these steps by way of a single device and in close proximity to one another, the likelihood of contamination of the cheese blocks is greatly reduced.

Although the invention has been described in considerable detail through the figures and above discussion, many variations and modifications can be made by one skilled in the art without departing from the spirit and scope of the invention as described in the following claims.

What is claimed is:

1. Cheese block former comprising:
   a. a housing defining a chamber therein, said housing having a first opening and a second opening;
   b. a hollow tower, said tower having a top end and a bottom end, said bottom end formed with an opening therein, the bottom end of said tower attached to said housing such that said tower is disposed above the first opening in said housing;
   c. a removable tubular, perforated lining hanging within said tower, said lining having a top end with an opening therein, a bottom end with an opening therein, and a flange disposed at the top end of said lining, said flange provided for free hanging said lining at the top of said tower and providing removably of the lining, wherein said lining extends substantially the full length of said tower;
   d. a drainage passage formed between said tower and said lining;
   e. a guillotine having a blade movable between a closed position in which said blade closes the lower end of said tower and an open position in which said blade is withdrawn from the lower end of said tower so as to leave the lower end of said tower open to said housing;
   f. means for introducing cheese curd into top of said tower; and
   g. an elevator positioned below said tower.

2. The cheese block former of claim 1 wherein the top of said lining is provided with a greater number of perforations than the bottom of said lining.

3. The cheese block former of claim 1 further comprising a former unit disposed below said tower and within said housing, said former unit comprising:
   a. a tubular chamber;
   b. means for rotating said tubular chamber between a first position for receiving a cheese block from said tower and a second position for ejection of a cheese block through the second opening in said housing; and
   c. means for ejecting a block of cheese from said tubular chamber.

4. The cheese block former of claim 1 further comprising bagging means for holding a receptacle for receipt of a cheese block, said bagging means disposed adjacent the second opening in said housing.

5. Cheese block former for producing multiple cheese blocks simultaneously comprising:
   a. a housing defining a chamber therein, said housing having a door and at least two openings;
   b. at least two hollow towers, each of said towers having a top end and a bottom end, said bottom end formed with an opening therein, the bottom end of each of said towers attached to said housing such that each of said towers is disposed above an opening in said housing;
   c. a tubular, perforated lining disposed within each of said towers, each of said linings having a top end with an opening therein, a bottom end with an opening therein, wherein said lining extends substantially the full length of said tower such that the bottom end of said lining is adjacent an opening in said housing;
   d. a drainage passage formed between each of said towers and the corresponding lining disposed therein;
   e. a guillotine having a blade movable between a closed position in which the blade closes the lower end of all of said towers and an open position in which the blade is withdrawn from the lower end of each of said towers so as to leave the lower end of each of said towers open to said housing;
   f. means for introducing cheese curd into top of each of said towers; and
   g. an elevator positioned below each of said towers.

6. A cheese block former comprising:

a. a housing defining a chamber therein, said housing having a door and at least two openings;

b. at least two hollow towers, each of said towers having a top end and a bottom end, said bottom end formed with an opening therein, the bottom end of each of said towers attached to said housing such that each of said towers is disposed above an opening in said housing;

c. a tubular, perforated lining hanging within each of said towers, each of said linings having a top end with an opening therein, a bottom end with an opening therein, and a flange disposed at the top end of said lining, said flange provided for attachment of said lining to the top of said tower in which said lining is disposed, wherein said lining extends substantially the full length of said tower and wherein the top of said lining is provided with a greater number of perforations than the bottom of said lining, each of said linings disposed such that the bottom end of each of said linings is adjacent an opening in said housing;

d. a drainage passage formed between each of said towers and the corresponding lining disposed therein;

e. a guillotine having a blade movable between a closed position in which the blade closes the lower end of all of said towers and an open position in which the blade is withdrawn from the lower end of each of said towers so as to leave the lower end of each of said towers open to said housing;

f. means for introducing cheese curd into top of each of said towers;

g. an elevator positioned below each of said towers;

h. a former unit disposed below each of said towers and within said housing, each of said former units comprising:
   (1) a tubular chamber;
   (2) means for rotating the former unit between a first position for receiving a cheese block from said tower and a second position for ejection of a cheese block through the door of said housing; and
   (3) means for ejecting a block of cheese from said tubular chamber.

i. bagging means for holding a receptacle for receipt of a cheese block, said bagging means disposed adjacent the door of said housing.

* * * * *

UNITED STATES PATENT AND TRADEMARK OFFICE
CERTIFICATE OF CORRECTION

PATENT NO. : 5,572,925
DATED : November 12, 1996
INVENTOR(S) : Van Pay, Stephen J., et al.

It is certified that error appears in the above-indentified patent and that said Letters Patent is hereby corrected as shown below:

Col. 8 Claim 1, line 9, delete "removably" and substitute therefor
-- removability -- .

Signed and Sealed this

Eleventh Day of February, 1997

Attest:

BRUCE LEHMAN

Attesting Officer     Commissioner of Patents and Trademarks